UNITED STATES PATENT OFFICE.

HARRY W. SUMMERS AND RAYMOND W. SUMMERS, OF DETROIT, MICHIGAN, ASSIGNORS TO DETROIT UNIVERSAL SOLVENT COMPANY, OF DETROIT, MICHIGAN.

VARNISH COMPOSITION.

1,413,628.     Specification of Letters Patent.     Patented Apr. 25, 1922.

No Drawing.     Application filed August 10, 1921. Serial No. 491,298.

*To all whom it may concern:*

Be it known that we, HARRY W. SUMMERS and RAYMOND W. SUMMERS, citizens of the United States, residing at Detroit, in the county of Wayne, State of Michigan, have invented a new and useful Varnish Composition, of which the following is a specification.

This invention relates to a composition of matter for use as a solvent oil, varnish, etc., one of the objects of the invention being to provide an efficient composition which can be manufactured inexpensively.

The invention consists of the following ingredients substantially in the proportions stated:

| | |
|---|---|
| Semi-paste synthetic gum (a commercial product consisting of pure vegetable gum, tung oil and thinners) | 50 % by weight. |
| Pure camphor gum | $\frac{1}{2}$% by weight. |
| Oil of lavender | $\frac{1}{2}$% by weight. |
| Naphtha | 49 % by weight. |

These ingredients are mixed thoroughly and it will be found that the composition is then ready for use as a solvent oil.

What is claimed is:—

1. A composition of matter for use as a solvent oil and the like, consisting of a semi-paste synthetic gum composed of pure vegetable gum, tung oil and thinners mixed with camphor gum, naphtha, and oil of lavender.

2. A composition of matter for use as a solvent oil or the like, including approximately 50% by weight of semi-paste synthetic gum composed of pure vegetable gum, tung oil and thinners, $\frac{1}{2}$% by weight of pure camphor gum, $\frac{1}{2}$% by weight of oil of lavender, and 49% by weight of naphtha.

In testimony that we claim the foregoing as our own, we have hereto affixed our signatures in the presence of two witnesses.

HARRY W. SUMMERS.
RAYMOND W. SUMMERS.

Witnesses:
DELLA THOMAS,
HAZEL W. SUMMERS.